US012811076B2

(12) United States Patent
Liu et al.

(10) Patent No.: US 12,811,076 B2
(45) Date of Patent: Nov. 24, 2026

(54) BUTTON

(71) Applicant: DARWIN PRECISIONS CORPORATION, Hsinchu County (TW)

(72) Inventors: chih-hung Liu, Hsinchu County (TW); Ya Han Ko, Hsinchu County (TW); Wei Chen, Hsinchu County (TW); Syuan-Wei Jhang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 19/274,672

(22) Filed: Jul. 21, 2025

(65) Prior Publication Data

US 2026/0171332 A1 Jun. 18, 2026

(30) Foreign Application Priority Data

Dec. 13, 2024 (TW) ................................ 113148790

(51) Int. Cl.
*H01H 13/04* (2006.01)
*H01H 13/02* (2006.01)

(52) U.S. Cl.
CPC .......... *H01H 13/04* (2013.01); *H01H 13/023* (2013.01)

(58) Field of Classification Search
CPC ............................ H01H 13/04; H01H 13/023
See application file for complete search history.

(56) References Cited

U.S. PATENT DOCUMENTS

| | | | | |
|---|---|---|---|---|
| 7,834,287 | B2 * | 11/2010 | Heiman | H03K 17/962 200/600 |
| 8,168,908 | B2 * | 5/2012 | Heimann | H03K 17/962 200/600 |
| 9,641,172 | B2 * | 5/2017 | Salter | H03K 17/962 |
| 11,928,882 | B2 | 3/2024 | Lai et al. | |
| 2006/0221603 | A1 * | 10/2006 | Zazzara | F21V 15/01 362/187 |
| 2018/0190446 | A1 * | 7/2018 | Chen | H01C 10/10 |
| 2019/0341205 | A1 * | 11/2019 | Wu | H01H 13/023 |
| 2020/0294735 | A1 * | 9/2020 | Wu | H01H 13/50 |
| 2024/0103292 | A1 | 3/2024 | You et al. | |

(Continued)

FOREIGN PATENT DOCUMENTS

| | | |
|---|---|---|
| CN | 206040479 U | 3/2017 |
| CN | 206249239 U | 6/2017 |
| CN | 207117595 U | 3/2018 |

(Continued)

*Primary Examiner* — Bryon T Gyllstrom

(57) ABSTRACT

A compositing button includes a substrate, a frame, a cover plate, an elastic conductive member, a contact switch and a sensing switch. The frame is disposed on the substrate, and the frame has an opening on one side away from the substrate. The cover plate is movably disposed in the opening. The elastic conductive member is connected between the substrate and the cover plate and surrounded by the frame. The sensing switch is electrically connected to the elastic conductive member and is adapted for generating a first control signal. The sensing switch forms a sensing area on one side of the cover plate away from the substrate through the elastic conductive member.

8 Claims, 9 Drawing Sheets

(56) References Cited

U.S. PATENT DOCUMENTS

2024/0285236 A1* 8/2024 Tehrani ................ A61B 5/6885

FOREIGN PATENT DOCUMENTS

| | | | |
|---|---|---|---|
| CN | 208539880 | U | 2/2019 |
| CN | 110301023 | A | 10/2019 |
| CN | 115938836 | A | 4/2023 |
| JP | 5292221 | B2 | 9/2013 |

* cited by examiner

BUTTON

FIELD OF THE INVENTION

The present invention relates to a button, in particular to a button with a contactless button function.

BACKGROUND OF THE INVENTION

Buttons are common signal input devices that users can input signals by simply pressing a button. For hygienic reasons, some buttons currently have a function of inputting instructions through contactless sensing methods such as infrared and ultrasonic. Among various contactless sensing methods, a capacitive sensing method, which generates signals by sensing changes in an electric field, has good developmental potential because of its good reliability in mechanical structure and wide variety of objects that can be sensed.

Capacitive sensing switches include switches using ITO electrodes, which have an advantage of small thickness. However, because a structure of the ITO electrode in a wire part is fragile compared to ordinary wires, it easily affects the usability and durability of the button.

SUMMARY OF THE INVENTION

The invention provides a button, having a function of a contactless button with a simple structure. And, the button is easy to maintain and assemble.

In order to achieve the above advantages, one embodiment of the present invention provides the button, which includes a substrate, a frame, a cover plate, an elastic conductive member, a contact switch, and a sensing switch. The frame is disposed on the substrate and has an opening on one side away from the substrate. The cover plate is movably disposed at the opening. The elastic conductive member is disposed between the substrate and the cover plate, and is surrounded by the frame. The sensing switch is electrically connected to the elastic conductive member and is adapted for generating a first control signal. The sensing switch forms a sensing area on one side of the cover plate away from the substrate through the elastic conductive member.

In one embodiment, the elastic conductive member is an elastic conductive pin.

In one embodiment, the elastic conductive member is a spring.

In one embodiment, the elastic conductive member is a conical spring that tapers in a direction from the cover plate to the substrate.

In one embodiment, the button further includes a light-emitting element. The light-emitting element is disposed on the substrate and surrounded by the spring.

In one embodiment, the cover plate is a light transmissive plate.

In one embodiment, the button further includes the contact switch, which is disposed on the substrate and located in the frame. The contact switch is adapted for generating a second control signal by being pushed against by the cover plate.

In one embodiment, the button further includes a middle frame. The middle frame is disposed in the frame and is located between the substrate and the cover plate, wherein the middle frame is adapted for contacting the contact switch by being pushed against by the cover plate.

In one embodiment, the middle frame has a main body and a plurality of elastic arms. The elastic arms extend from the main body toward the substrate. The elastic arms are adapted for creating a gap between the main body and the contact switch. The main body contacts the cover plate and is adapted for contacting the contact switch by being pushed against by the cover plate.

In one embodiment, the elastic conductive member has a conductive frame and a plurality of conductive elastic arms. The conductive elastic arms extend from the conductive frame toward the substrate and are electrically connected to the substrate. The conductive elastic arm is adapted for creating a gap between the conductive frame and the contact switch. The conductive frame contacts the cover plate and is adapted for forming the sensing area, and the conductive frame is further adapted for contacting the contact switch by being pushed against by the cover plate.

From the above description, the button of the present invention uses the elastic conductive member as a medium to generate the sensing area required for the sensing switch. Therefore, a number of components of the button can be reduced, the structure of the button can be simplified, and the button can be easily maintained and assembled.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the following article, the terms used in the description of embodiments based on the present invention, such as: the description of the orientation or positional relationship indicated by “up”, “down”, etc., are described according to the orientation or positional relationship shown in the schema used, and the above terms are only for convenience in describing the present invention and are not for limiting the present invention, That is, the components mentioned must not be indicated or implied to be in a specific orientation, constructed in a specific orientation. In addition, the terms "first" and "second" mentioned in this specification or in the scope of the patent application are only used to name the name of the component (element) or to distinguish different embodiments or scopes, and are not used to limit the upper or lower limit on the number of components.

Figure 1:
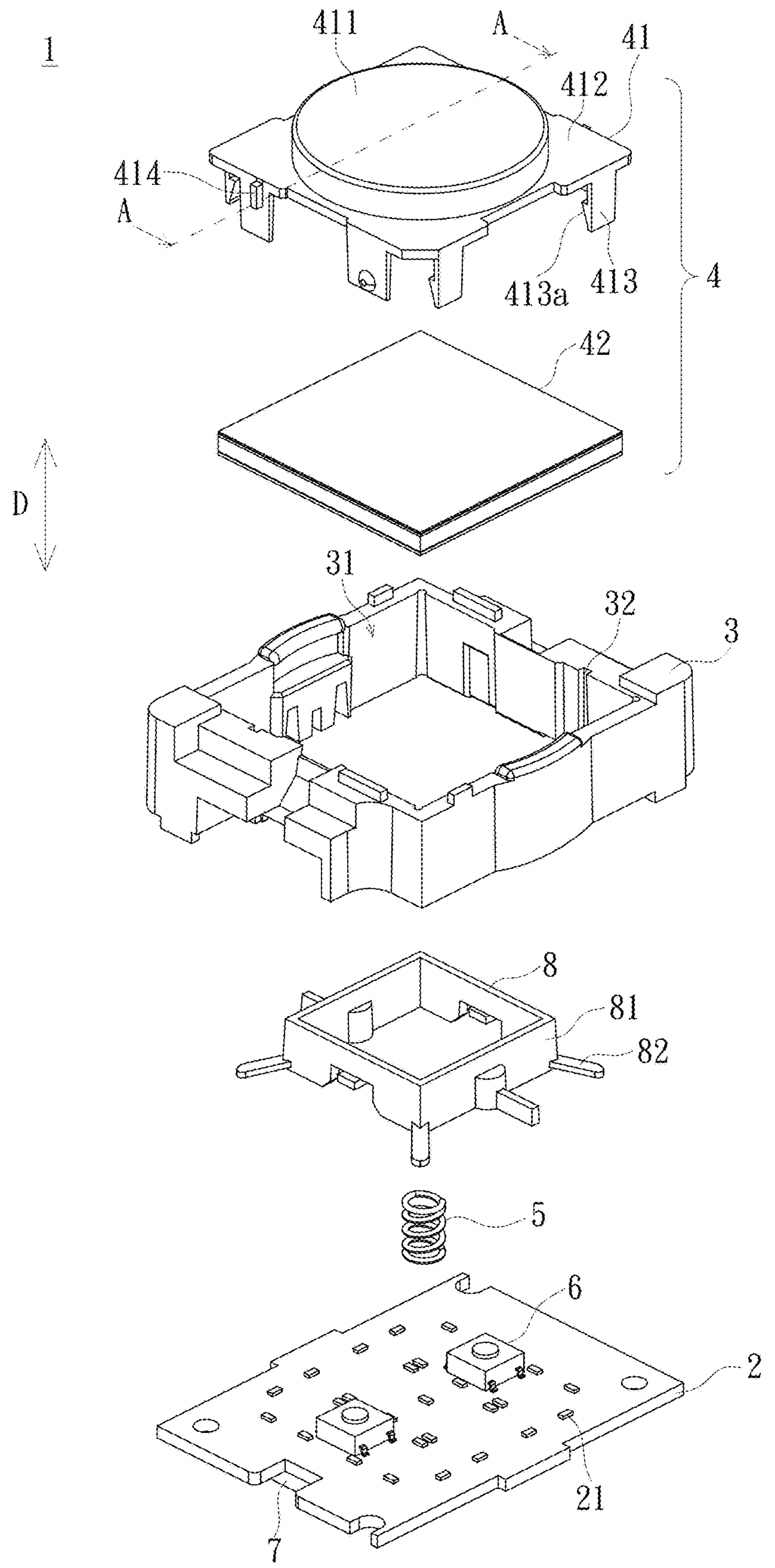
FIG. 1 is a schematic diagram of decomposition of a button according to a first embodiment of the present invention.
Figure 2:
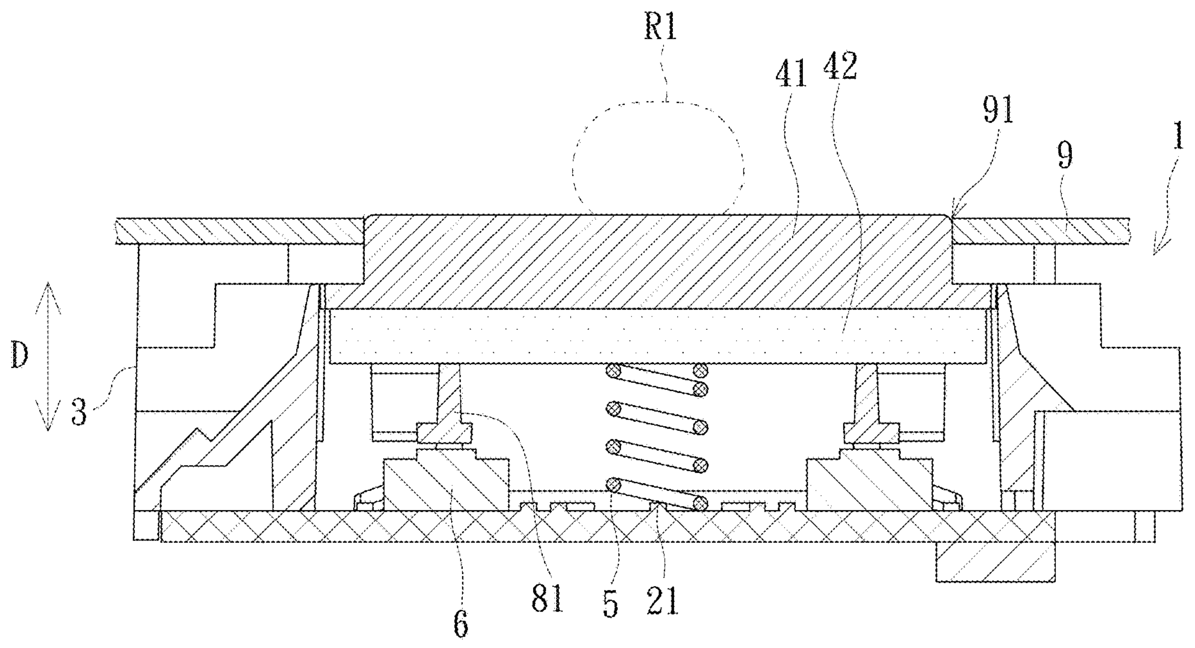
FIG. 2 is a cross-sectional schematic diagram of the button, taken along the A-A cross-sectional line, according to the embodiment of FIG. 1.

FIG. 1 is a schematic diagram of the decomposition of a button according to a first embodiment of the present invention. FIG. 2 is a cross-sectional schematic diagram of the button, taken along the A-A cross-sectional line, according to the embodiment of FIG. 1. The size of the sensing area shown in each figure in the following description is for illustration only, and the actual size of the sensing area can be adjusted according to requirements. As shown in FIGS. 1 and 2, the button 1 of the present embodiment includes a substrate 2, a frame 3, a cover plate 4, an elastic conductive member 5, and a sensing switch 7. The frame 3 is disposed on the substrate 2 and has an opening 31 on one side away from the substrate 2. The cover plate 4 is movably disposed at the opening 31. The elastic conductive member 5 is connected between the substrate 2 and the cover plate 4 and is disposed in the frame 3. The sensing switch 7 is electrically connected to the elastic conductive member 5 and adapted for generating a first control signal. The sensing switch 7 forms a sensing area R1 on one side of the cover plate 4 away from the substrate 2 through the elastic conductive member 5 (see FIG. 2).

According to the present invention, there is no restriction on an installation object of the button 1, and the button 1 can be installed to, such as but not limited to, an elevator or other operable devices. During installation, the button 1 is, for example, mounted on a decorative plate 9 of the elevator (FIG. 2), and the cover plate 4 is exposed by an opening 91 on the decorative plate 9.

As shown in FIGS. 1 and 2, the substrate 2 is adapted for directly or indirectly carrying various components required for the button 1. These components include the frame 3, the cover plate 4, the elastic conductive member 5, and the sensing switch 7. The substrate 2 is, for example but not limited to, a printed circuit board (PCB). A shape and a size of the substrate 2 are not restricted and can be, for example, corresponded to a shape of the frame 3 according to requirements.

As shown in FIGS. 1 and 2, the frame 3 is adapted for accommodating the cover plate 4 and the elastic conductive member 5, and the frame 3 is fixed on the decorative plate 9 when installing the button 1, but is not limited thereto. A material of the frame 3 is, for example, plastic. The frame 3 is, for example, a rectangular frame but can be set according to requirements. A size of the frame 3 is not particularly restricted. For example, a size of the opening 31 of the frame 3 can be larger than or equal to a size of the opening 91 on the decorative plate 9 (as shown in FIG. 2).

As shown in FIGS. 1 and 2, the cover plate 4 covers the opening 31 and is adapted for preventing and protecting the elastic conductive member 5 from being exposed. In the present embodiment, the cover plate 4 is also adapted for forming a pattern that expresses an intention of the operating button 1, but the method will be described in detail later.

As shown in FIGS. 1 and 2, in the present embodiment, the elastic conductive member 5 is connected between the substrate 2 and the cover plate 4. The elastic conductive member 5 is, for example, a spring fixed on the substrate 2. At a specific position, the elastic conductive member 5 is, for example, connected to the substrate 2 and corresponds to a center of the cover plate 4. In a thickness direction D of the button 1, a length of the elastic conductive member 5 when no external force is applied is, for example, slightly greater or equal to a distance between the cover plate 4 and the substrate 2. This can prevent the elastic conductive member 5 from being separated from the substrate 2 or moving inside the button 1 and affecting a position of the sensing area R1.

As shown in FIGS. 1 and 2, the sensing switch 7 is, for example, installed on the substrate 2. An installation position of the sensing switch 7 is not particularly restricted. For example, the installation position of the sensing switch 7 can be on one side surface of the substrate 2 away from the frame 3, but is not limited thereto. The sensing switch 7 is, for example, a capacitive sensing switch. Specifically, the sensing switch 7 includes, for example, an oscillation circuit (not shown in the figure), which can sense whether an object is close to the button 1 by sensing changes (such as changes in oscillation frequency, etc.) caused by an object with static electricity entering its set electric field range (including the sensing area R1). At a specific position, in the present embodiment, the sensing area R1 of the sensing switch 7 is formed on one side of the cover plate 4 away from the substrate 2 only through the elastic conductive member 5 as a medium.

As shown in FIGS. 1 and 2, in the present embodiment, the button 1 further includes, for example, a contact switch 6. The contact switch 6 is disposed on the substrate 2 and located in the frame 3, and is adapted for generating a second control signal by being pushed against by the cover plate 4. By arranging the contact switch 6, the button 1 can be used as a button that generates control signals by a pressing method and by a contactless method at the same time.

The contact switch 6 is, for example, a push-button switch (or tactile switch), which is adapted for generating the second control signal when being pressed or contacted. Specifically, in the present embodiment, the contact switch 6 is, for example, pushed by the middle frame 8 which is driven by the cover plate 4 (described in detail later) and then generates the second control signal. However, in other embodiments, because a shape of the cover plate 4 is not particularly restricted, the contact switch 6 can also be directly pushed by the cover plate 4 and then generates the second control signal in some embodiments.

As shown in FIGS. 1 and 2, in the present embodiment, the button 1 further includes, for example, a middle frame 8. The middle frame 8 is located in the frame 3, between the substrate 2 and the cover plate 4, and surrounds the elastic conductive member 5. The middle frame 8 can be made of elastic material, such as plastic.

Figure 3:
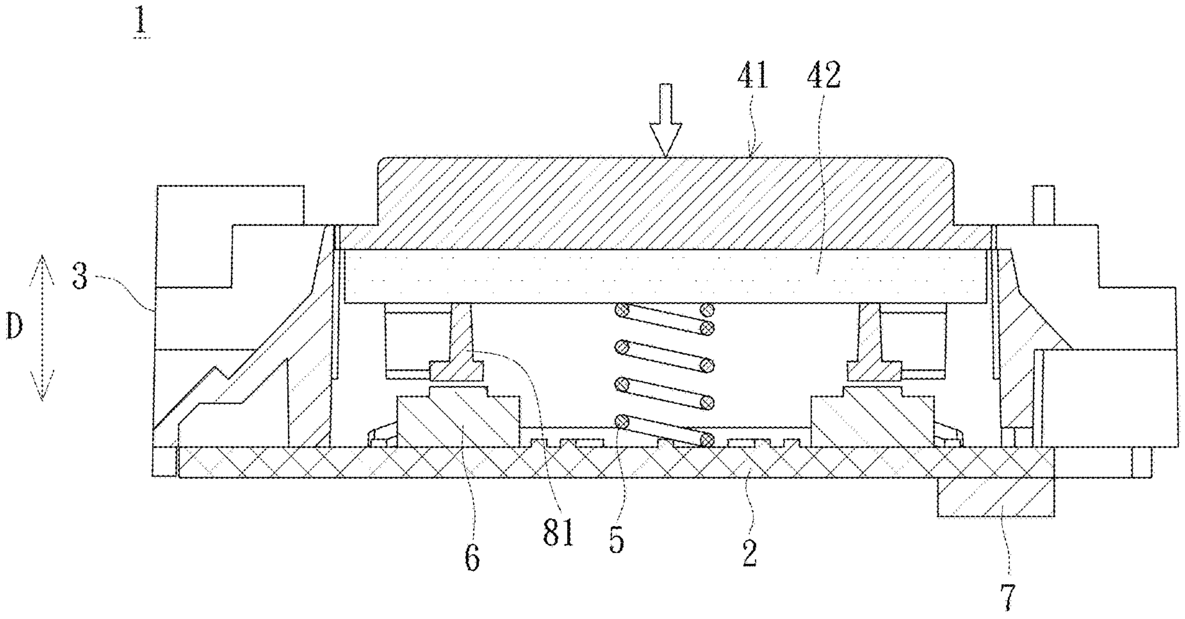
FIGS. 3 and 4 are schematic diagrams of an action of the button, taken along the A-A section line, according to the embodiment of FIG. 1.
Figure 4:
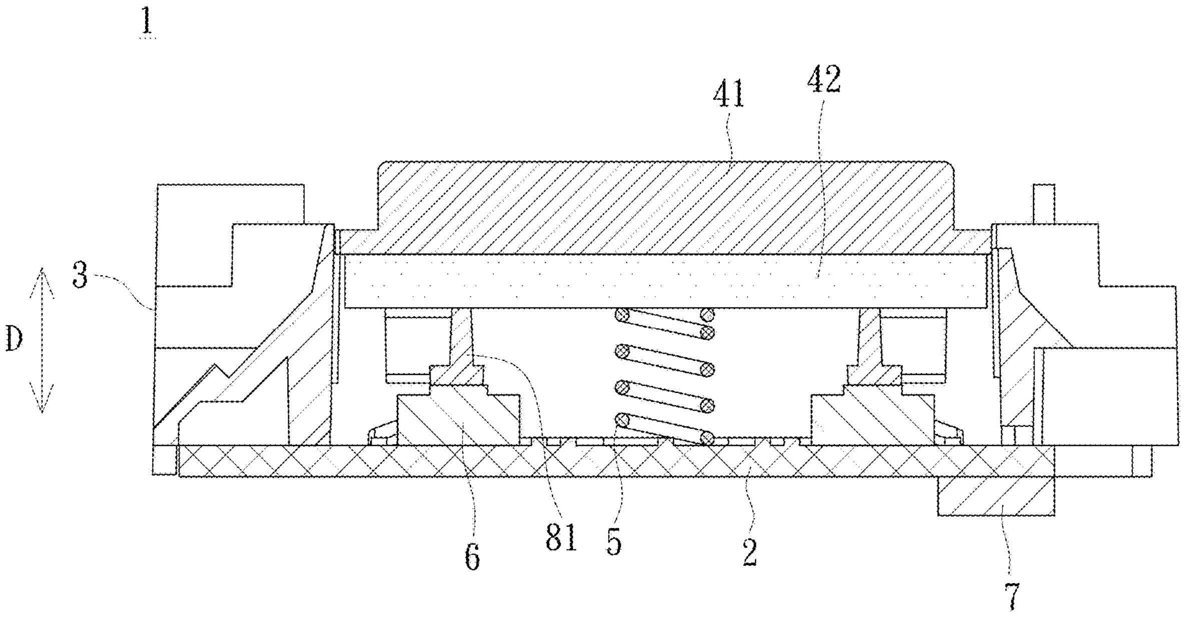

FIGS. 3 and 4 are schematic diagrams of an action of the button, taken along the A-A section line, according to the embodiment of FIG. 1. Specifically, the middle frame 8 has, for example, a main body 81 and a plurality of elastic arms 82 surrounding the main body 81. The main body 81 is adapted for contacting the cover plate 4 when no external force is applied and contacts the contact switch 6 by being pushed against by the cover plate 4 when the cover plate 4 moves. A shape of the main body 81 is, for example, a rectangle. A position of the main body 81 is, for example, above the contact switch 6 in the pressing direction (same as the thickness direction D of the button 1).

Figure 5:
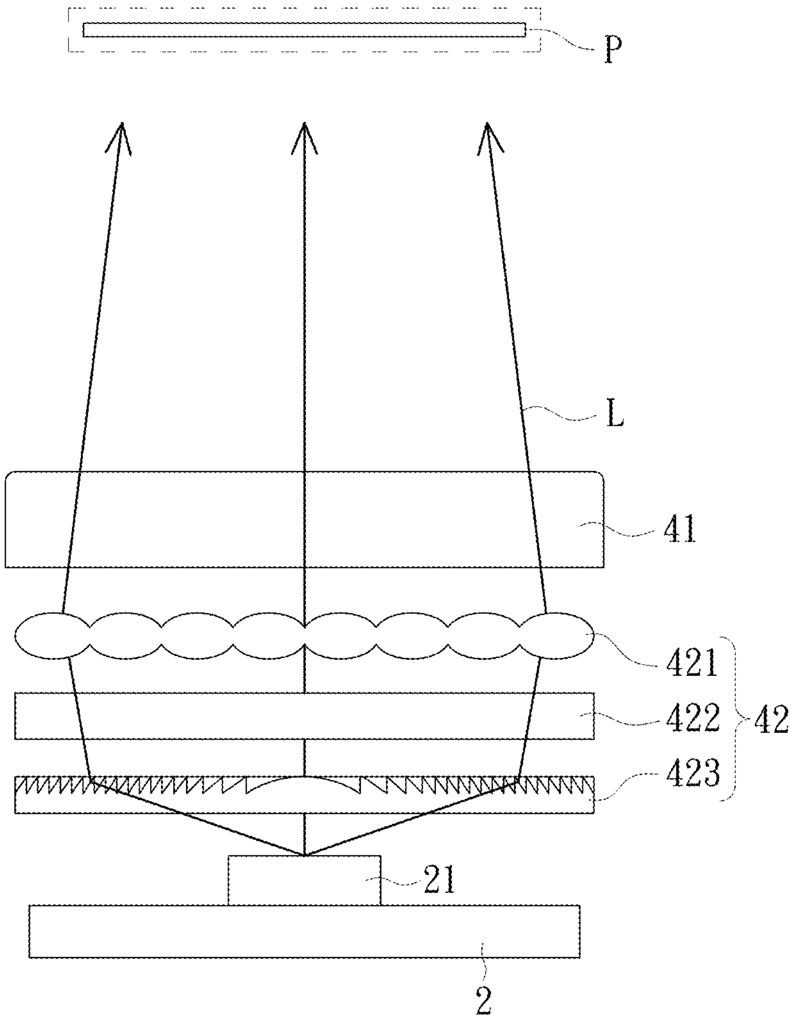
FIG. 5 is a schematic diagram of an operation of the optical imaging assembly according to the embodiment of FIG. 1.

In the thickness direction D, the elastic arms 82 are located on one side of the main body 81 close to the substrate 2. And, the elastic arms 82 extend obliquely from the main body 81 toward the substrate 2 along the thickness direction D. The elastic arms 82 can be integrally formed with the main body 81, as shown in FIG. 2. With the present structure, the main body 81 of the middle frame 8 can contact a bottom of the cover plate 4, and is supported on the substrate 2 through the elastic arms 82 on one side away from the cover plate 4 to create a gap from the contact switch 6 when the button 1 is not subject to pushing by external force. As shown in FIGS. 4 and 5, by changing the shape of the elastic arms 82, the main body 81 can contact and press the contact switch 6 when the middle frame 8 is pushed by the cover plate 4. It should be understood that in some embodiments, the button 1 may not include the middle frame 8 by changing the cover plate 4 or changing the detailed component shape of the contact switch 6.

As shown in FIGS. 1 and 2, in the present embodiment, the button 1 further includes, for example, a light-emitting element 21. The light-emitting element 21 is installed on the substrate 2 and is adapted for projecting a light beam L toward the opening 31. The light-emitting element 21 is, for example, a light-emitting diode (LED), and the wavelength range of the light beam L is, for example, within the wavelength range of visible light, but is not limited thereto. Specifically, a number of light-emitting elements 21 is, for example, multiple, and the number and arrangement of the light-emitting elements 21 can be set according to requirements.

In the present embodiment, because the elastic conductive member 5 is a spring, the elastic conductive member 5 has gaps and does not easily affect a light path direction of the light-emitting element 21. As shown in FIGS. 1 and 2, in the present embodiment, the elastic conductive member 5 can be disposed around the light-emitting element 21, and can also be surrounded by the other light-emitting elements 21.

As shown in FIGS. 1 and 2, the cover plate 4 covers the opening 31. In the present embodiment, because the button 1 has a function of a contact button, the cover plate 4 is also adapted to be in contact with a user's finger and is adapted to move toward the substrate 2 when pushed by the finger to trigger the contact switch 6. In addition, in the present embodiment, the cover plate 4 is, for example, a light transmissive member and includes a pressing member 41 and an optical imaging assembly 42.

As shown in FIGS. 1 and 2, the pressing member 41 is located on one side of the cover plate 4 away from the substrate 2, and is adapted for contacting a user's finger and protecting the optical imaging assembly 42. The pressing member 41 is, for example, formed by plastic injection molding. In terms of a specific shape, the pressing member 41 includes, for example, a pressing part 411 and an outer flange 412. For example, the pressing part 411 has a circular shape that corresponds to and similar to a shape of the opening 91 on the decorative plate 9. The outer flange 412 surrounds the pressing part 411, corresponds to a shape of the opening 31 of the frame 3, and can cover the entire opening 31. As shown in FIG. 2, in the thickness direction D, a thickness of the pressing part 411 can be greater than a thickness of the outer flange 412. During assembly, a surface of the pressing part 411 can be aligned with a surface of the decorative plate 9.

In the present embodiment, the pressing member 41 includes, for example, a fixing block 413 and a guiding block 414. The fixing block 413 is adapted for fixing the optical imaging assembly 42. For example, the fixing block 413 extends from the outer flange 412 along the thickness direction D toward the substrate 2, and is provided with a claw **413*a* at one end. The claw 413*a* is used to lock the optical imaging assembly 42. The guiding block 414 is disposed on a wall surface of the fixing block 413 away from the pressing part 411, and is adapted for sliding in the guide rail 32 on an inner wall surface of the frame 3 during assembly. In the present embodiment, during sliding, the guiding block 414 can snap against a wall of an end of the guide rail 32 away from the substrate 2, which therefore preventing the cover plate 4 from detaching from the opening 31**.

It should be understood that the shapes and structures of the above-mentioned various pressing members 41 can be set according to requirements and are not limited to the above examples.

FIG. 5 is a schematic diagram of an operation of the optical imaging assembly according to the embodiment of FIG. 1. As shown in FIG. 5, the optical imaging assembly 42 is, for example, disposed on one side of the pressing member 41 close to the substrate 2 through the fixing block 413. The optical imaging assembly 42 is adapted for forming a suspending optical image P on one side of the cover plate 4 away from the substrate 2. The shape of the optical imaging assembly 42, for example, corresponds to the shape of the pressing member 41, but is not limited thereto. The optical imaging assembly 42, for example, sequentially includes a lens array 421, an imaging unit 422, and a light path conversion unit 423 in the direction toward the substrate 2.

The lens array 421 is located on one side of the optical imaging assembly 42 away from the substrate 2. The lens array 421 is, for example, a lens array composed of a plurality of lenticular lenses, and is adapted for allowing the light beam L passing through the imaging unit 422 to form a three-dimensional image. The lens array 421 can determine an imaging position of the suspending optical image P, for example, the position corresponding to the sensing area R1. In other embodiments not shown in the figure, the lens array 421 may also be a single-sided convex lens array, which can be configured according to requirements. A material of the lens array 421 is not restricted, such as glass or transparent acrylic resin.

The imaging unit 422 is disposed opposite to a side of the lens array 421 that faces the substrate 2. The imaging unit 422 is, for example, a film, a mask, or a layer film with a preset pattern, but is not limited thereto. The preset pattern on the imaging unit 422 corresponds to the suspending optical image P that is to be presented after the light beam L passes through the optical imaging assembly 42. An image content of the suspending optical image P is not restricted; for example, the suspending optical image P corresponds to the pattern required by the device on which the button 1 is installed, such as the number representing the elevator floor or the pattern indicating the intention of an operation command input through the button 1 (e.g., opening or closing of a door).

The light path conversion unit 423 is disposed on one side of the optical imaging assembly 42 close to the substrate 2 and is adapted to diffuse and/or convert the light beam L into a parallel light beam to improve brightness of the suspended optical image P. The light path conversion unit 423 is, for example, a Fresnel lens, but is not limited thereto. A material of the light path conversion unit 423 can be the same as the material of the lens array 421, but is not particularly limited thereto. In some embodiments, the optical imaging assembly 42 may not have the light path conversion unit 423 when the light-emitting elements 21 are disposed on the substrate 2 to provide uniform illumination.

Figure 6:
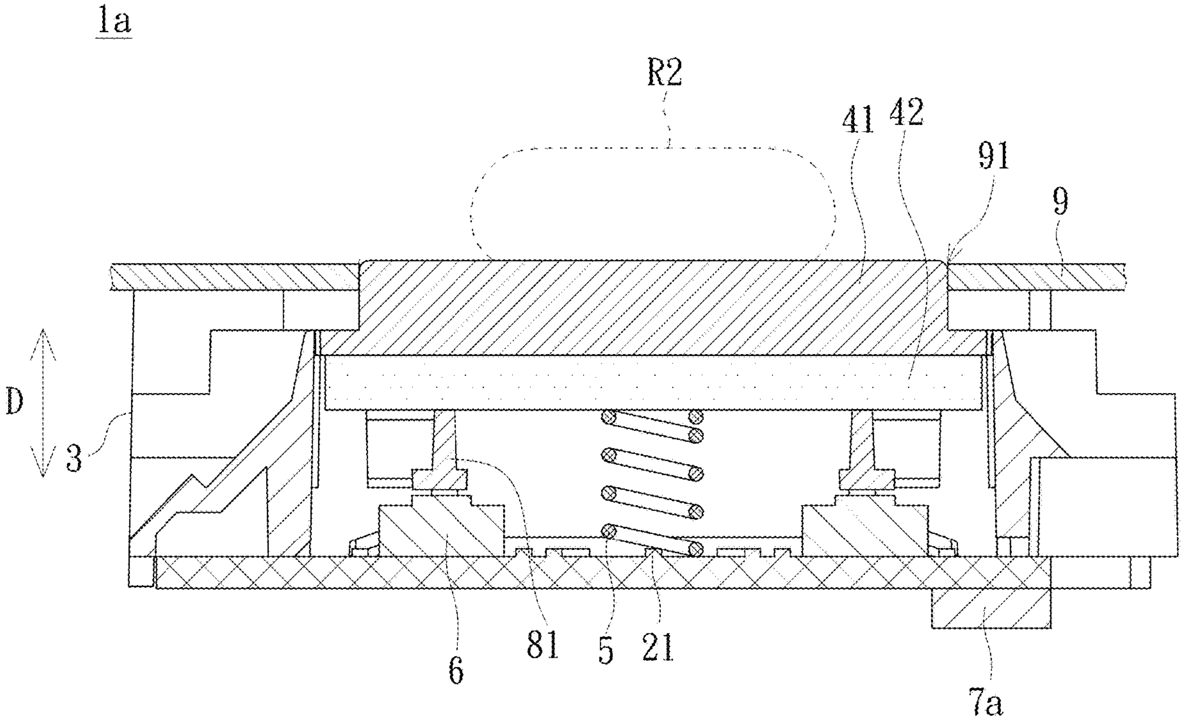
FIG. 6 to FIG. 9 are schematic diagrams of sensing areas of buttons according to other embodiments of the present invention.

FIGS. 6 to 9 are schematic diagrams of sensing areas of buttons according to other embodiments. As shown in FIG. 2 and FIG. 6, a position and a size of the sensing area R1 can be determined according to a position of the elastic conductive member 5 or a performance (sensitivity) of the sensing switch 7. Specifically, as shown in FIG. 2, the button 1 of the present embodiment, for example, forms the sensing area R1 at a center of the cover plate 4 by installing the elastic conductive member 5 at the center of the cover plate 4. In the embodiment of FIG. 6, a button 1*a* can form a sensing area R2 larger than the sensing area R1 at the same location through the same elastic conductive member 5 by using a sensing switch 7*a* that has a higher sensitivity than the sensing switch 7 without changing the design or the position of the elastic conductive member 5, but a manner of changing the sensing area is not limited thereto.

Figure 7:
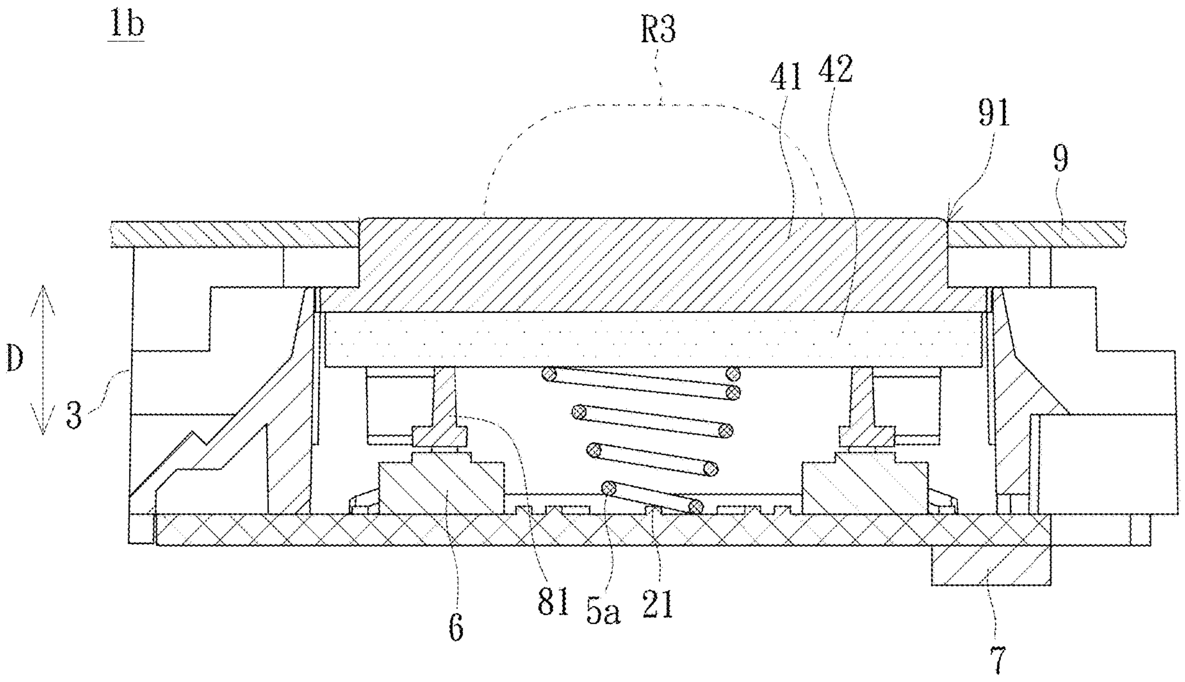

As shown in FIG. 7, in one embodiment, an elastic conductive member 5*a* of a button 1*b* is, for example, a conical spring that gradually tapers in a direction from the cover plate 4 toward the substrate 2, so that a projection area of the elastic conductive member 5*a* on one side close to the cover plate 4 in the thickness direction D is larger than a projection area on one side close to the substrate 2. Thus, as shown in FIGS. 2 and 7, since the projection area of the elastic conductive member 5*a* of the button 1*b* close to the cover plate 4 is larger than a projection area of the elastic conductive member 5 of the button 1 close to the cover plate 4, the button 1*b* can form a sensing area R3 that is larger than the sensing area R1 of the button 1. It should be understood that a method of changing size of the sensing area by changing a shape of the elastic conductive member 5 can be coordinated with a method of changing the sensitivity of the sensing switch 7.

Figure 8:
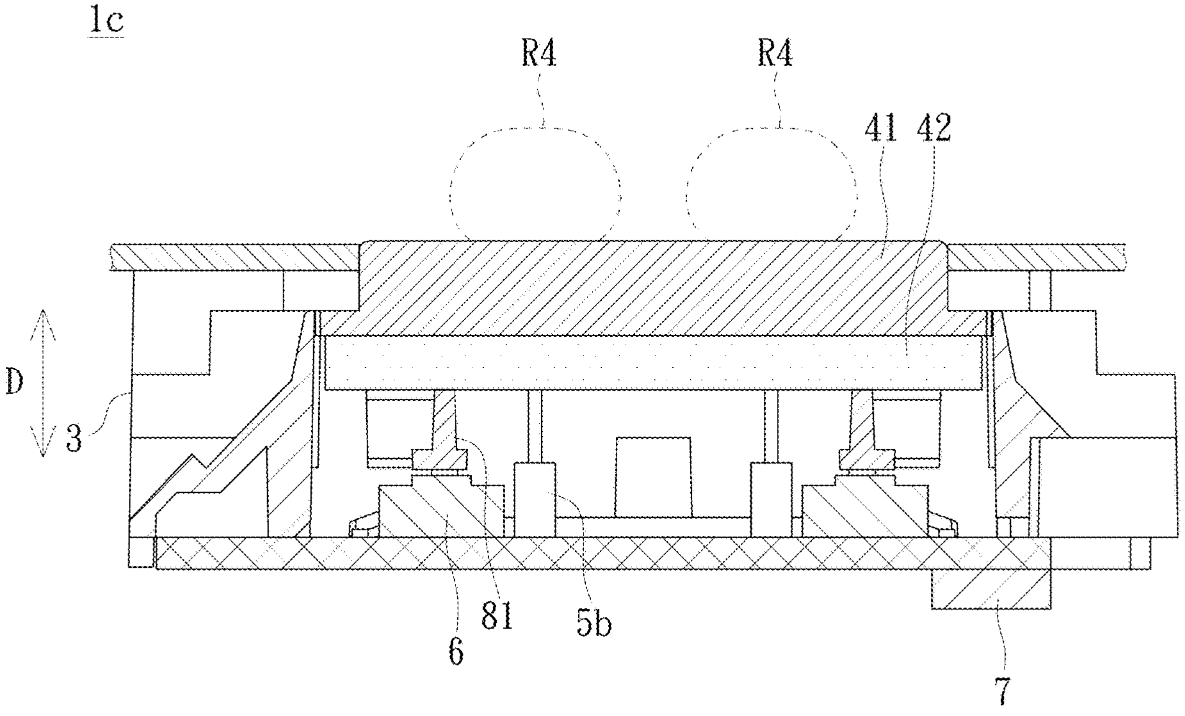

As shown in FIG. 8, in one embodiment, an elastic conductive member 5*b* of a button 1*c* is, for example, a plurality of conductive pins (or pogo pins) that evenly distribute in the frame 3, and a sensing area R4 is increased by increasing a number of the elastic conductive member 5*b*. As shown in FIGS. 2 and 8, since the number of the elastic conductive members 5*b* of the button 1*c* is greater than a number of the elastic conductive members 5 of the button 1, the button 1*c* can form the sensing area R4, composed of multiple sensing areas (shown in FIG. 6), which is larger than the sensing area R1 of the button 1.

Figure 9:
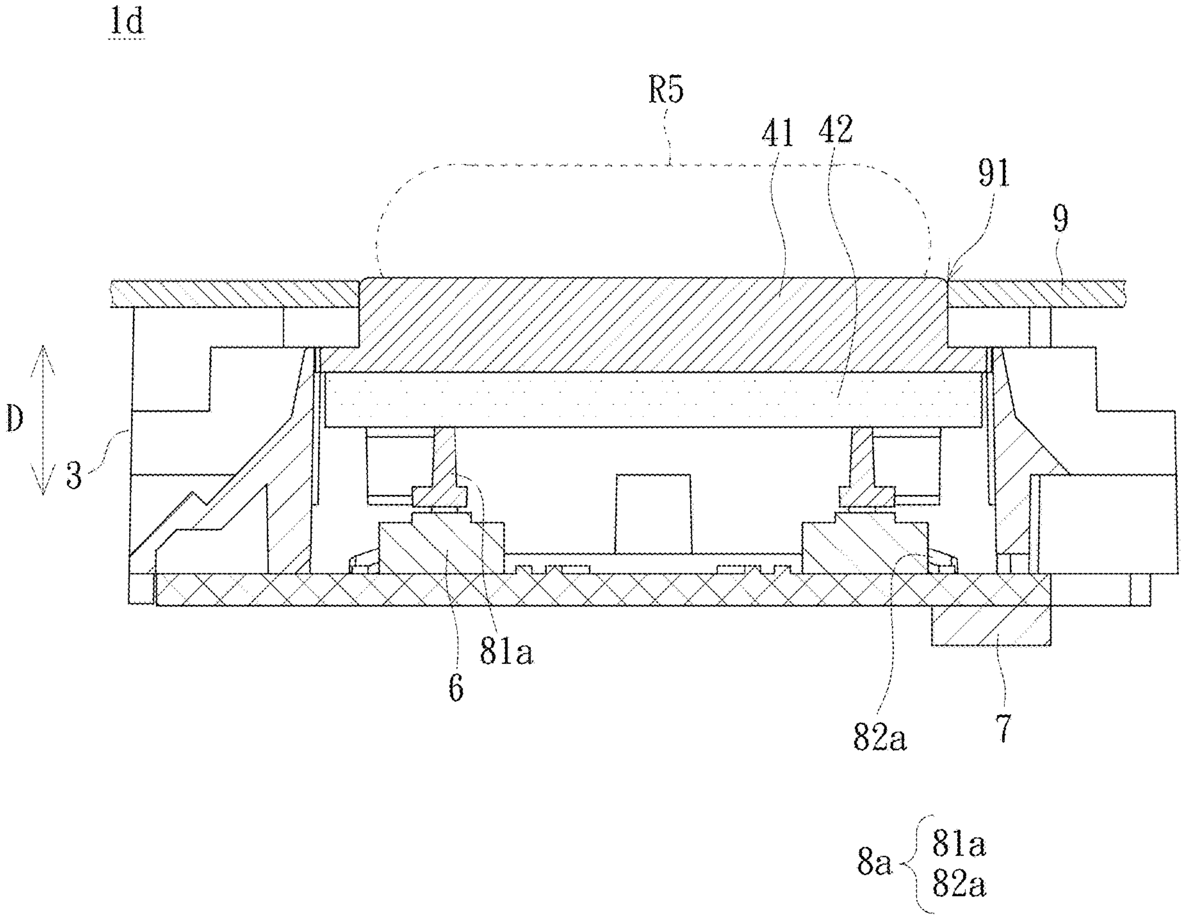

As shown in FIG. 9, in one embodiment, a middle frame 8*a* of a button 1*d* can be entirely made of conductive material. The middle frame 8*a* includes, for example, a conductive frame 81*a* (a shape of the conductive frame 81*a* can correspond to the main body 81) and a conductive elastic arm 82*a* (a shape of the conductive elastic arm 82*a* can correspond to the elastic arm 82). In the present embodiment, the middle frame 8*a* can be used as the elastic conductive member, and a sensing area R5 is formed through the conductive frame 81*a*. The middle frame 8*a* is electrically connected to the substrate 2 and the sensing switch 7 through the conductive elastic arms 82*a*. In one embodiment not shown in the figure, a frame having a shape similar to the middle frame 8*a* can be first made of non-conductive material, and then a metal frame adapted for forming a sensing area is set on a side of the frame that contacts the cover plate 4. And, metal contacts for electrically connecting to the substrate 2 are set on elastic arms of the frame, and the metal contacts and the metal frame are electrically connected through wires or conductive patterns on the frame to form a component that is substantially similar in the function and the shape of the above-mentioned middle frame 8*a*.

It can be seen from the above description that in the above embodiments, the sensing area may be only related to the elastic conductive member and the sensing switch 7 but has nothing to do with a design of the cover plate 4. In other words, the shape and material of the cover plate 4 can be selected arbitrarily. In addition, the sensing switch in each of the above embodiments generates the first control signal by means of whether an object enters the sensing area. However, the sensing switch 7 can also generate the first control signal at the same time without specially setting relevant control elements when the button 1 generates the second control signal through the contact switch 6, but the present invention is not limited thereto.

Based on the above description, the button of the present invention uses the elastic conductive member as the medium for generating the sensing area required for the sensing switch. Therefore, the number of components of the button can be reduced, the structure of the button can be simplified, and the button can be easily maintained and assembled. In the embodiments in which the contact switch is provided as a button having both the functions of the contact button and the contactless button, the button can further reduce the number of components for constructing the button and simplify the structure of the button, since the elastic conductive member can simultaneously generate the rebound force required for the contact switch and the sensing area required for the sensing switch.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A button, comprising:

a substrate;

a frame, disposed on the substrate, wherein the frame has an opening on one side away from the substrate;

a cover plate, movably disposed at the opening;

at least one elastic conductive member, disposed between the substrate and the cover plate and surrounded by the frame;

a sensing switch, electrically connected to the at least one elastic conductive member and adapted for generating a first control signal, wherein the sensing switch forms at least one sensing area on one side of the cover plate away from the substrate through the at least one elastic conductive member acting as a sensing medium; and a contact switch, disposed on the substrate and located in the frame, wherein the contact switch is adapted for generating a second control signal by being pushed against by the cover plate, wherein the at least one elastic conductive member has a conductive frame and a plurality of conductive elastic arms, the conductive elastic arms extend from the conductive frame toward the substrate, the conductive elastic arms are adapted for creating a gap between the conductive frame and the contact switch, the conductive frame contacts the cover plate and is adapted for forming the sensing area, and the conductive frame is further adapted for contacting the contact switch by being pushed against by the cover plate.

2. The button according to claim 1, wherein the cover plate is a light transmissive plate.

3. A button, comprising:

a substrate;

a frame, disposed on the substrate, wherein the frame has an opening on one side away from the substrate;

a cover plate, movably disposed at the opening;

at least one elastic conductive member, disposed between the substrate and the cover plate and surrounded by the frame;

a sensing switch, electrically connected to the at least one elastic conductive member and adapted for generating a first control signal, wherein the sensing switch forms at least one sensing area on one side of the cover plate away from the substrate through the at least one elastic conductive member acting as a sensing medium;

a contact switch, disposed on the substrate and located in the frame, wherein the contact switch is adapted for generating a second control signal by being pushed against by the cover plate; and a middle frame, disposed in the frame and located between the substrate and the cover plate, wherein the middle frame is adapted for contacting the contact switch by being pushed against by the cover plate.

4. The button according to claim 3, wherein the at least one elastic conductive member is at least one elastic conductive pin.

5. The button according to claim 3, wherein the at least one elastic conductive member is a spring.

6. The button according to claim 5, wherein the elastic conductive member is a conical spring that tapers in a direction from the cover plate to the substrate.

7. The button according to claim 5, wherein the cover plate further comprises at least one light-emitting element, and the at least one light-emitting element is disposed on the substrate and surrounded by the spring.

8. The button according to claim 3, wherein the middle frame has a main body and a plurality of elastic arms, the elastic arms extend from the main body toward the substrate, the elastic arms are adapted for creating a gap between the main body and the contact switch, and the main body contacts the cover plate and is adapted for contacting the contact switch by being pushed against by the cover plate.

* * * * *